US011802491B2

(12) United States Patent
Kumar et al.

(10) Patent No.: US 11,802,491 B2
(45) Date of Patent: Oct. 31, 2023

(54) TURBINE BLADE HEALTH MONITORING SYSTEM FOR IDENTIFYING CRACKS

(71) Applicant: Siemens Energy, Inc., Orlando, FL (US)

(72) Inventors: Manish Kumar, Oviedo, FL (US); Roger W. Heinig, Cocoa Beach, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 39 days.

(21) Appl. No.: 17/771,831

(22) PCT Filed: Dec. 3, 2020

(86) PCT No.: PCT/US2020/063105
§ 371 (c)(1),
(2) Date: Apr. 26, 2022

(87) PCT Pub. No.: WO2021/113508
PCT Pub. Date: Jun. 10, 2021

(65) Prior Publication Data
US 2022/0403753 A1 Dec. 22, 2022

Related U.S. Application Data

(60) Provisional application No. 62/944,102, filed on Dec. 5, 2019.

(51) Int. Cl.
F01D 21/00 (2006.01)
G01M 15/14 (2006.01)

(52) U.S. Cl.
CPC ........... F01D 21/003 (2013.01); G01M 15/14 (2013.01); F05D 2220/30 (2013.01); F05D 2260/80 (2013.01); F05D 2260/83 (2013.01)

(58) Field of Classification Search
CPC . F01D 21/003; G01M 5/0016; G01M 5/0066; G01M 5/0033; G01M 15/14;
(Continued)

(56) References Cited

U.S. PATENT DOCUMENTS 8,624,603 B2 * 1/2014 Lee .................. H01Q 9/16
324/629
8,742,319 B2 * 6/2014 Sheikman .............. G01B 7/023
250/221

(Continued)

FOREIGN PATENT DOCUMENTS

CN 102436515 A 5/2012
CN 110389171 A 10/2019

OTHER PUBLICATIONS

PCT International Search Report and Written Opinion of International Searching Authority dated Mar. 4, 2021 corresponding to PCT International Application No. PCT/US2020/063105 filed Dec. 3, 2020.

Primary Examiner — Igor Kershteyn

(57) ABSTRACT

A method of determining the location and size of a crack in a blade includes measuring a time of arrival of a tip of the blade at an angular position in a rotation, using the time of arrival to calculate a displacement of the tip of the blade, and using the displacements to calculate a first vibration condition and a second vibration condition for the blade. The method also includes comparing the first vibration condition and the second vibration condition for the blade to a predetermined baseline first vibration condition and a predetermined baseline second vibration condition for the blade to determine a change in the first vibration condition and a change in the second vibration condition, and using the magnitude of the change in the second vibration condition relative to the change in the first vibration condition to determine the likely location of the crack and using the (Continued)

magnitude of the change in the first vibration condition and the change in the second vibration condition to determine the size of the crack.

22 Claims, 10 Drawing Sheets

(58) Field of Classification Search
CPC .............. G01H 1/006; G05B 23/0213; G05B 23/0235; F05D 2220/30; F05D 2260/80; F05D 2260/83; F05D 2270/334; F05D 2270/708; F05D 2270/71; F05D 2270/11
See application file for complete search history.

(56) References Cited

U.S. PATENT DOCUMENTS

| | | | |
|---|---|---|---|
| 8,854,052 B2 * | 10/2014 | Sheikman | G01B 15/00 |
| | | | 324/629 |
| 9,476,318 B2 * | 10/2016 | Datchanamoorthy | ........................ |
| | | | F01D 21/003 |
| 9,568,301 B2 * | 2/2017 | Lu | G01H 11/06 |
| 2005/0278127 A1 | 12/2005 | Griffin et al. | |
| 2007/0043497 A1 * | 2/2007 | Leogrande | G01S 13/88 |
| | | | 701/100 |
| 2010/0161245 A1 | 6/2010 | Rai et al. | |
| 2012/0051911 A1 | 3/2012 | Baik et al. | |
| 2013/0082833 A1 | 4/2013 | Bhattacharya et al. | |
| 2014/0030092 A1 | 1/2014 | Heinig et al. | |
| 2014/0114587 A1 | 4/2014 | Czerniak et al. | |
| 2017/0097323 A1 | 4/2017 | D'Souza et al. | |

* cited by examiner

Mode 1            Mode 2

Crack 502

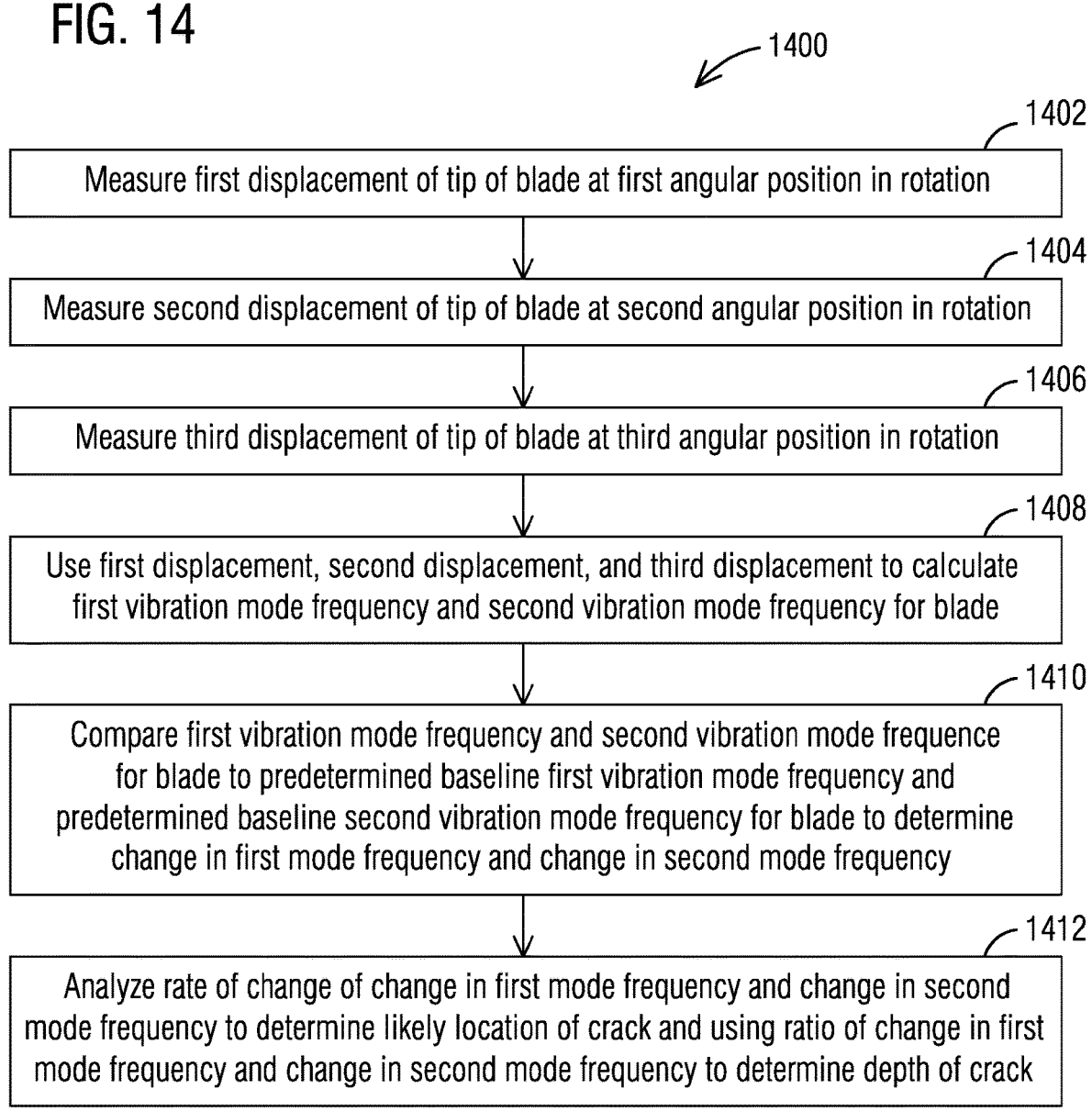

TURBINE BLADE HEALTH MONITORING SYSTEM FOR IDENTIFYING CRACKS

BACKGROUND

Turbines, and in particular steam turbines include large blades (i.e., long length to width ratio) that are susceptible to vibration and high cycle fatigue. In situ measurement of these blades has proved to be difficult and inaccurate. As such, frequent inspections and conservative operation are often employed to assure that the blades do not fail unexpectedly.

BRIEF SUMMARY

In one construction, a method of determining the location and size of a crack in a blade in a turbomachine includes operating the turbomachine including a row of blades that includes a plurality of blades that contains the blade, determining a first vibration condition for each blade of the row of blades, and determining a second vibration condition for each blade of the row of blades. The method also includes comparing the first vibration condition for each blade to a predetermined baseline first vibration condition to determine a change in the first vibration condition, and comparing the second vibration condition for each blade to a predetermined baseline second vibration condition to determine a change in the second vibration condition. The method further includes analyzing the change in the first vibration condition and the change in the second vibration condition for each blade to determine which of the blades includes a crack and the likely location of the crack within that blade, and using the magnitudes of the change in the first vibration condition and the change in the second vibration condition to estimate a size of the crack.

In another construction, a blade health monitoring system for measuring the health of a row of rotating blades includes a sensor fixedly positioned adjacent the row of rotating blades and operable to measure a parameter and a computer including a processor. The processor operates to determine a first mode vibration condition and a second mode vibration condition for each of the blades in the row of rotating blades based on the measured parameter, the processor further operates to compare each first mode vibration condition and second mode vibration condition to a baseline first vibration condition and a baseline second vibration condition to determine a change in the first vibration condition and a change in the second vibration condition. The processor determines the position and size of a crack in any one of the blades using the change in the first vibration condition and the change in the second vibration condition.

In another construction, a method of determining the location and size of a crack in a blade includes measuring a time of arrival of a tip of the blade at an angular position in a rotation, using the time of arrival to calculate a displacement of the tip of the blade, and using the displacements to calculate a first vibration condition and a second vibration condition for the blade. The method also includes comparing the first vibration condition and the second vibration condition for the blade to a predetermined baseline first vibration condition and a predetermined baseline second vibration condition for the blade to determine a change in the first vibration condition and a change in the second vibration condition, and using the magnitude of the change in the second vibration condition relative to the change in the first vibration condition to determine the likely location of the crack and using the magnitude of the change in the first vibration condition and the change in the second vibration condition to determine the size of the crack.

BRIEF DESCRIPTION OF THE DRAWINGS

To easily identify the discussion of any particular element or act, the most significant digit or digits in a reference number refer to the figure number in which that element is first introduced.

FIG. 14 illustrates a routine in accordance with one embodiment.

DETAILED DESCRIPTION

Figure 1:
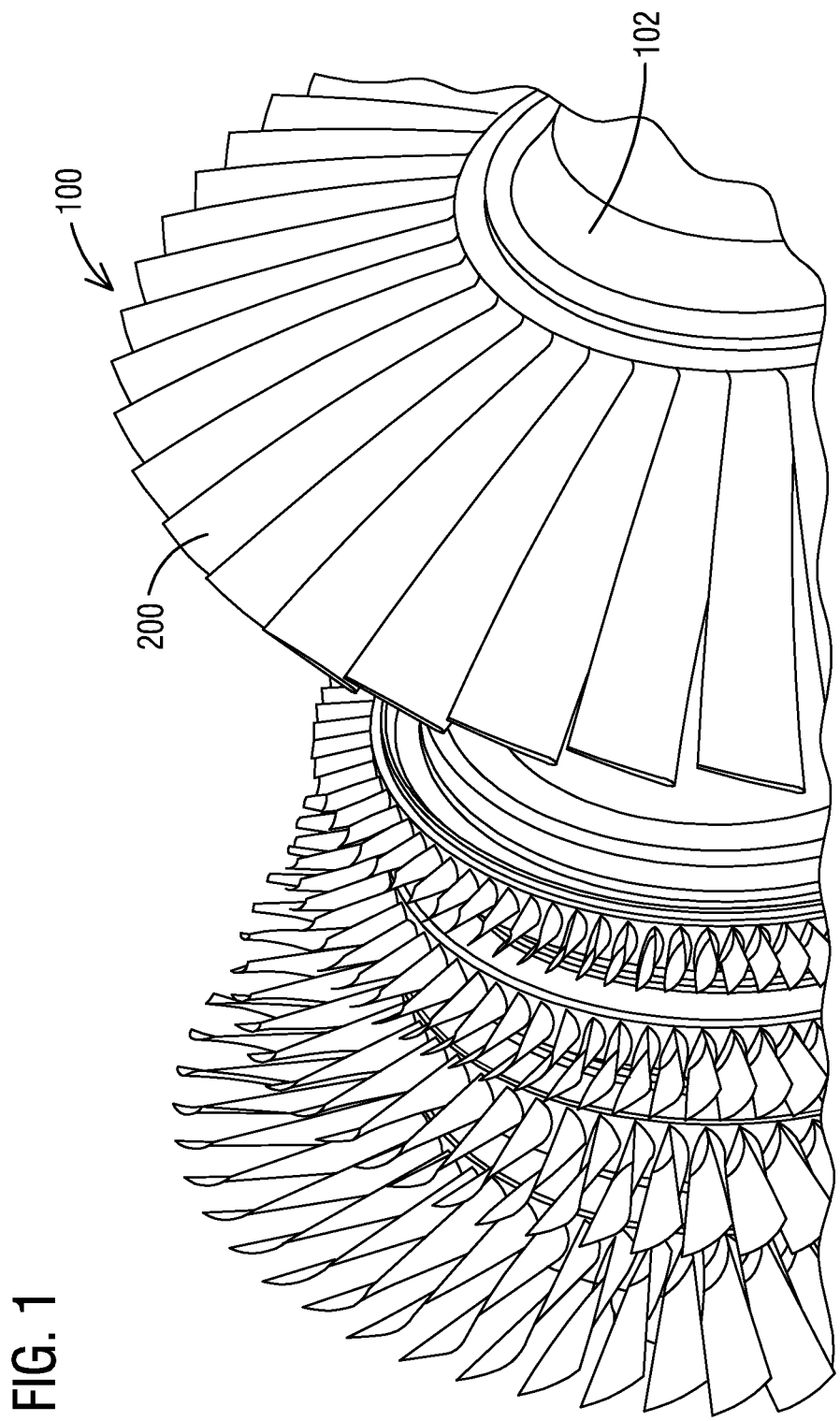
FIG. 1 illustrates a turbine rotor.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus.

It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

FIG. 1 illustrates a turbine rotor 100 and in particular a low-pressure steam turbine rotor 100 as are commonly found in steam turbines used in power generation facilities. The turbine rotor 100 includes a shaft 102 that supports a plurality of blade rows. The turbine rotor 100 in this example is a double flow low pressure turbine rotor 100 arranged such that the rows extend in two opposing longitudinal directions along the shaft 102 to define two opposed flows. The last blade row in each direction includes a quantity of blades 200 supported by the shaft 102 for rotation. It should be noted that in some constructions, each of the blades attaches directly to the shaft 102 while other constructions may include a separate disk that supports the blades 200 and attaches to the shaft 102.

Figure 2:
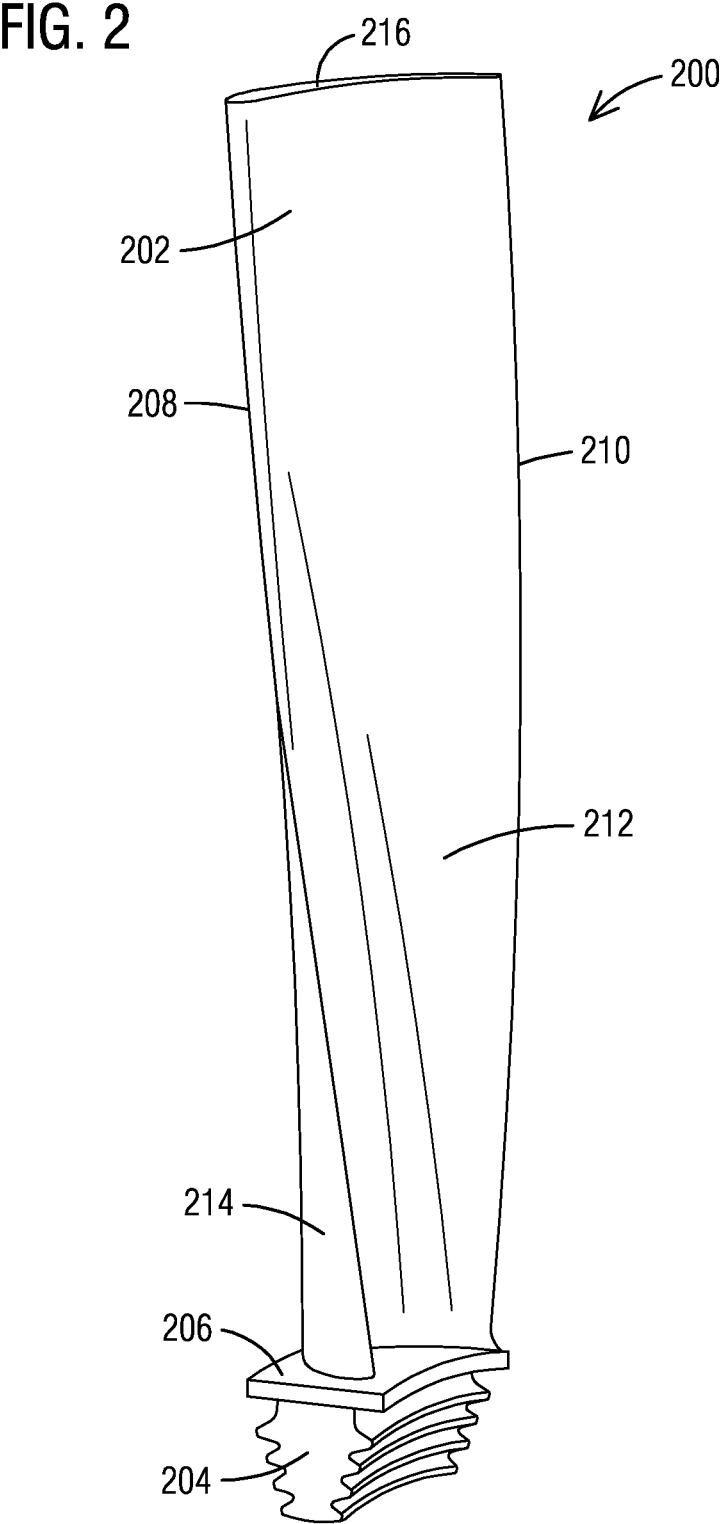
FIG. 2 illustrates a blade of the turbine rotor of FIG. 1.

FIG. 2 illustrates one of the blades 200 of FIG. 1 in greater detail. In this example, each of the blades 200 is a free-standing (i.e., no tie-wires, shrouds, etc.) last stage blade and includes a vane portion 202, a root 204, and a platform 206. Of course, non-free-standing blades could be employed as well. The root 204 in the illustrated construction is a curved fir-tree root 204 with other root designs also being suitable for use in attaching each of the blades 200 to the shaft 102 or to a disk. The vane portion 202 is an airfoil shaped portion arranged to cooperate with adjacent blades 200 to efficiently provide for the expansion of a working fluid (e.g., steam) as it passes through the blades 200. The expansion of the working fluid provides for the extraction of energy from the working fluid such that the blades 200 transmit a torque to the shaft 102 which can be used to drive another component such as a generator, a pump, a compressor, or any other desired rotating device. The platform 206 operates as an interface or connection point between the vane portion 202 and the root 204.

Returning to the vane portion 202, it should be understood that each vane portion 202 includes a leading edge 208, a trailing edge 210, a pressure side 212 that extends between the leading edge 208 and the trailing edge 210, and a suction side 214 that extends between the leading edge 208 and the trailing edge 210. Each of the leading edge 208, trailing edge 210, pressure side 212, and suction side 214 extends from the platform 206 to a tip 216.

During operation of the steam turbine, the free-standing blades 200 are susceptible to vibration in multiple modes. During typical operation each of the blades 200 will exhibit measurable vibration at the tip 216 in two blade vibration modes 300 illustrated in FIG. 3. A first mode 302 is referred to as a fundamental easywise bending mode and a second mode 304 is referred to as a fundamental stiffwise bending mode.

In addition to these fundamental bending modes, other vibration modes including torsional oscillations at various resonant frequencies of the turbine rotor 100, or oscillations at various higher resonant frequencies of the blades 200 themselves, can produce measurable motions of the blades 200 during normal turbine operation.

Figure 4:
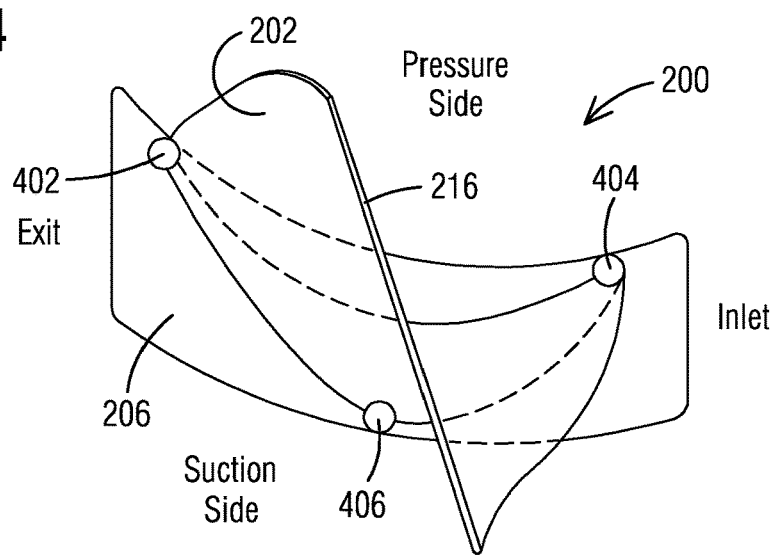
FIG. 4 illustrates possible crack locations on the blade of FIG. 2.

FIG. 4 illustrates three locations in the roots 204 of the blades 200 where potentially life-limiting cracks can form in response to the aforementioned bending modes. FIG. 4 illustrates one of the blades 200 looking radially inward from the tip 216 toward the platform 206. A first crack location 402 is located at the trailing edge 210 beneath the platform 206 in an uppermost neck of the root 204. A second crack location 404 is located at the trailing edge 210 inward of the platform 206 in an uppermost neck of the root 204. Both the first crack location 402 and the second crack location 404 tend to form near the pressure side 212 of the vane portion 202. A third crack location 406 is approximately midway between the leading edge 208 and the trailing edge 210 on the suction side 214 of the vane portion 202 and beneath (radially inward) the platform 206.

Figure 5:
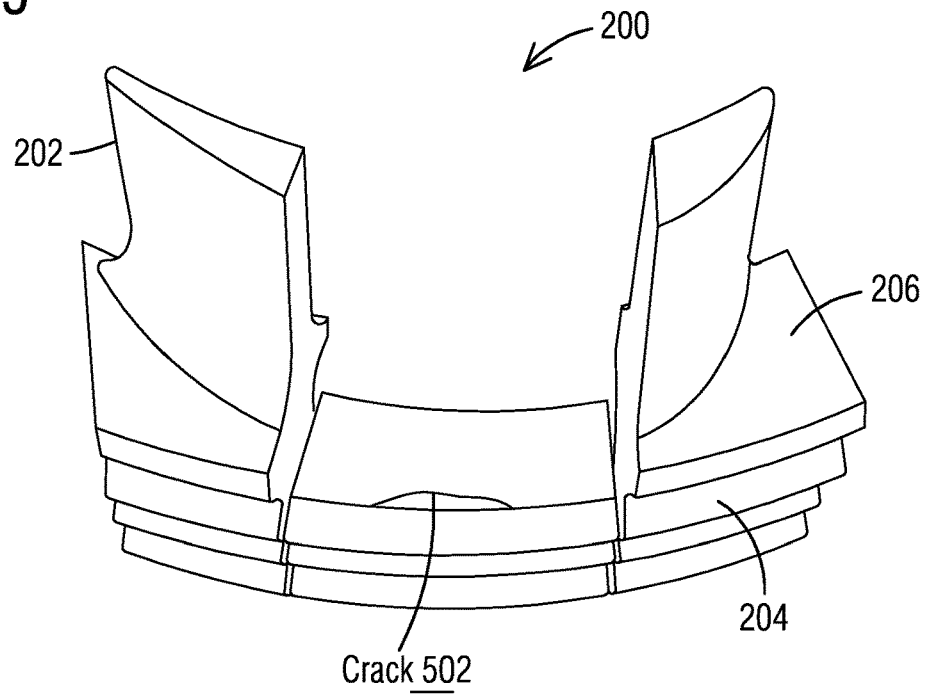
FIG. 5 illustrates a partially disassembled blade illustrating a crack.

FIG. 5 illustrates one of the blades 200 in a partially disassembled state. The vane portion 202 and the platform 206 are removed in the area above (radially outward) the third crack location 406 to better illustrate a crack 502 formed in the third crack location 406.

Figure 3:
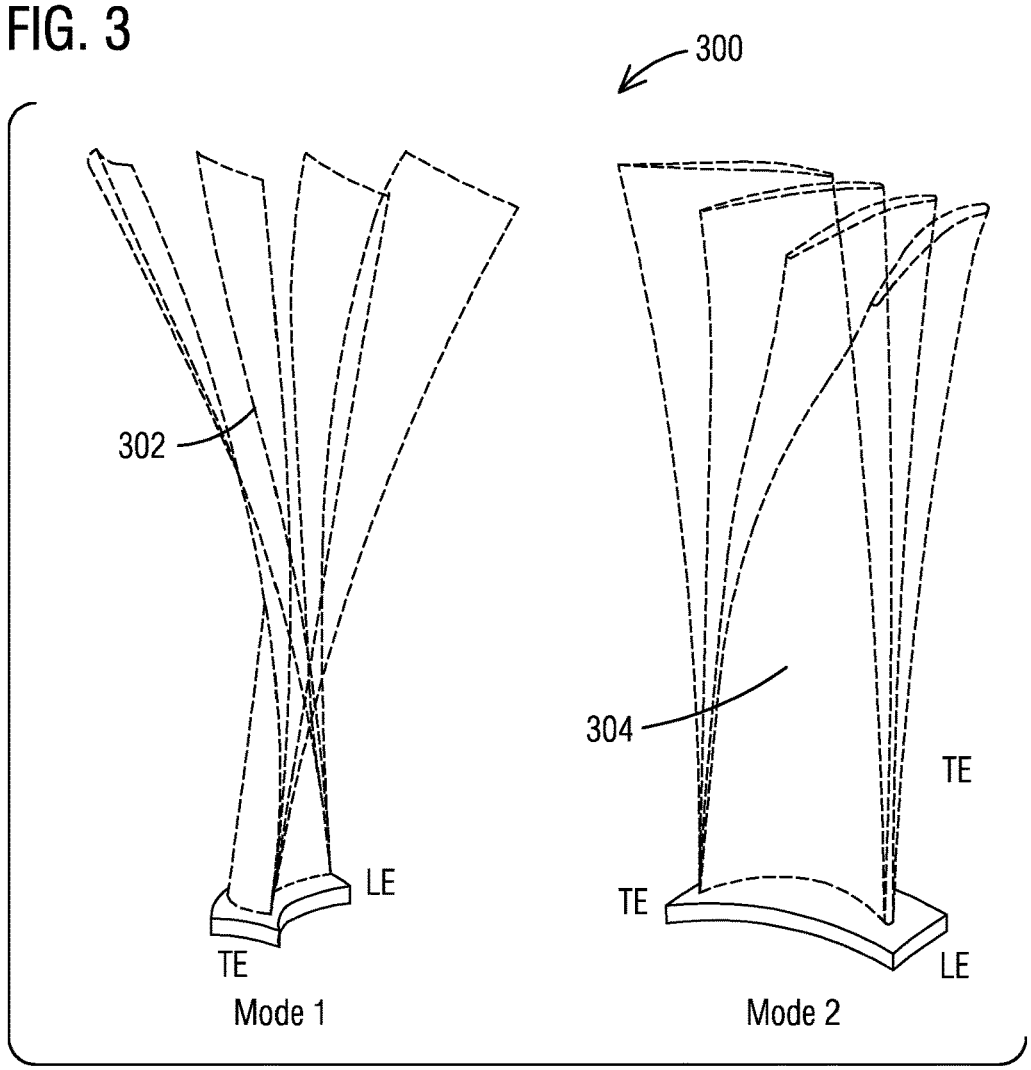
FIG. 3 illustrates blade vibration modes 300 of the blade of FIG. 2.
Figure 6:
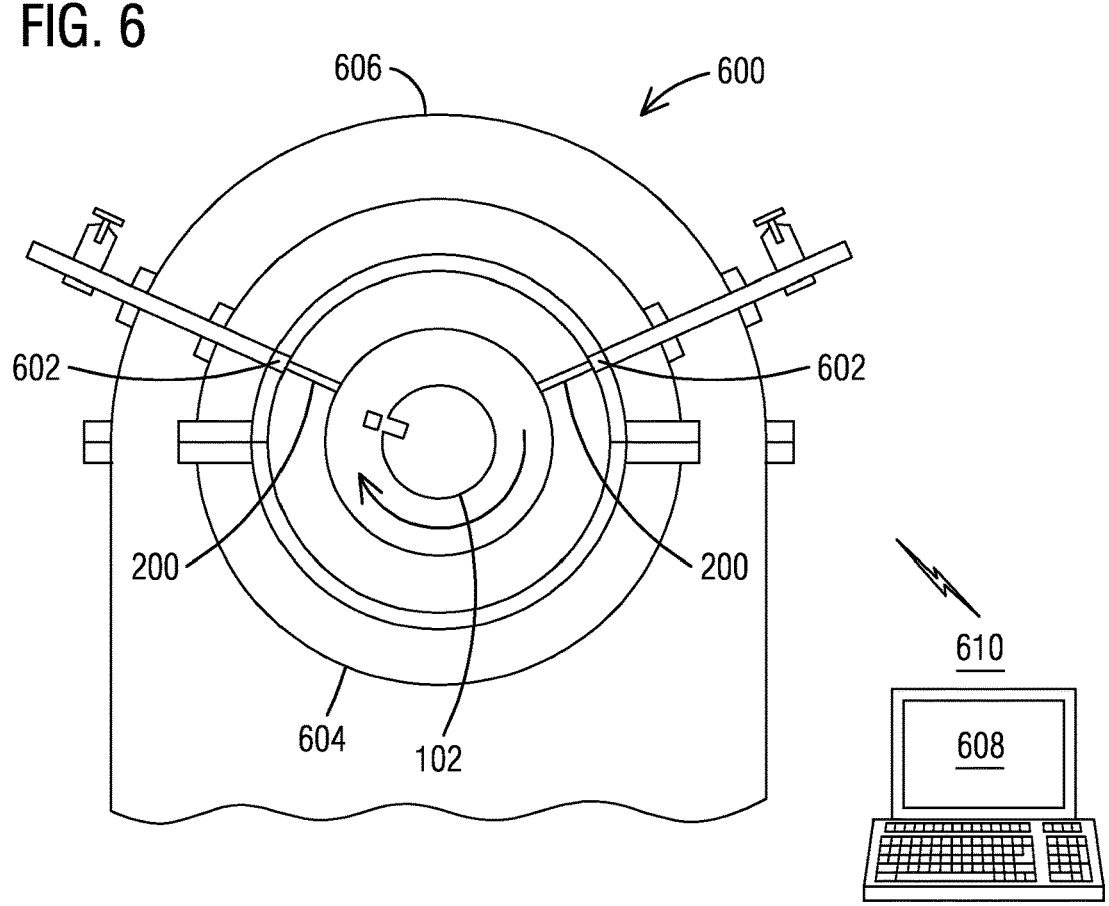
FIG. 6 illustrates a blade health monitoring system 600 incorporated into a low-pressure turbine.

FIG. 6 illustrates a portion of a blade health monitoring system 600 that is well-suited to the detection of blades 200 vibrating in the blade vibration modes 300 illustrated in FIG. 3 as well as in other vibration modes. In the illustrated construction, a first sensor 602 and a second sensor 602 are positioned adjacent the tip 216 of the rotating blades 200. In the construction illustrated in FIG. 6, each sensor 602 is mounted to an inner cylinder 604 (or casing) which surrounds and encloses the turbine rotor 100. The wires from each sensor 602 can be enclosed in a sensor tube that also passes through an outer cylinder 606. The wires can then be connected to a transceiver to broadcast collected data 610 to a computer 608 or the data 610 can be transmitted via a wired connection.

In one construction, a third sensor 602 is connected to the inner cylinder 604 like the first sensor 602 and the second sensor 602. Each sensor 602 is positioned circumferentially 120 degrees (plus or minus 15 degrees) from each adjacent sensor 602 such that the sensors 602 are evenly spaced around the longitudinal axis of the shaft 102. While the just described arrangement includes sensors 602 that are equally spaced from one another, other constructions may include unequal spacing. In other constructions, fewer than three sensors, or more than three sensors may be employed. For example, some constructions employ just a single sensor 602 and may include a second sensor 602 as a backup.

It should also be noted that all the sensors can be located in one half of the turbine casing or can be distributed evenly. Locating the sensor 602 or sensors 602 all in a lower half has the advantage of allowing the sensors and their associated hardware and wiring to remain in-place during typical disassembly. Locating the sensor 602 or sensors 602 in an upper half can make it easier to install the sensors and their associated hardware and wiring into an existing turbine and can provide easier access during operation.

Each of the sensors 602 (or the single sensor 602) measures a time of arrival for the tip 216 of each blade 200. The time of arrival can be used by the computer 608 to determine the actual displacement of the tip 216 or the displacement of the tip 216 versus an expected position. Other constructions may use other sensors or methods to determine the displacement of the tip 216.

The computer 608 could be a local computer 608 that is part of a power plant control system or that is separate from the power plant control system. In still another alternative, the computer 608 is located remotely and the analysis is performed by the computer 608 and then transmitted or otherwise provided to the power plant or the users.

It should be understood that an example computer may include at least one data processing system. A data processing system may comprise at least one processor (e.g., a microprocessor/CPU, GPU, and the like). The processor may be configured to carry out various processes and functions described herein by executing from a memory, computer/processor executable instructions corresponding to one or more applications (e.g., software and/or firmware) or portions thereof that are programmed to cause the at least one processor to carry out the various processes and functions described herein.

The memory may correspond to an internal or external volatile or nonvolatile processor memory (e.g., main memory, RAM, and/or CPU cache), that is included in the processor and/or in operative connection with the processor. Such a memory may also correspond to non-transitory nonvolatile storage device (e.g., flash drive, SSD, hard drive, ROM, EPROMs, optical discs/drives, or other non-transitory computer readable media) in operative connection with the processor.

Figure 7:
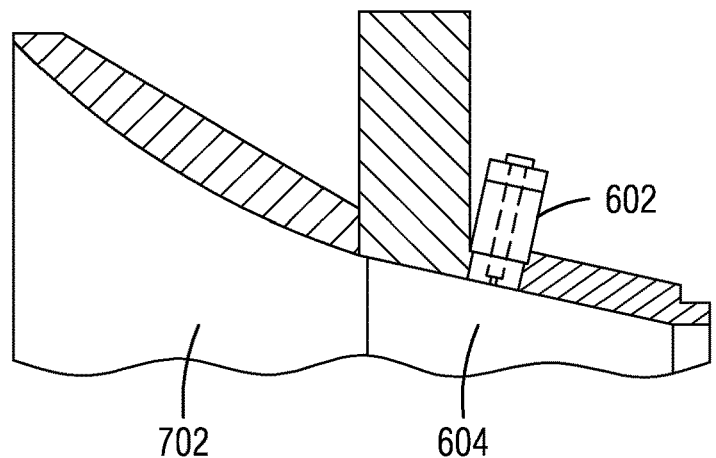
FIG. 7 illustrates an inner cylinder of a low-pressure turbine including a sensor.

FIG. 7 is an enlarged view of an alternative installation for the sensor 602. In this construction, the sensor 602 is directly attached to the inner cylinder 604 upstream of a diffuser 702. The construction illustrated in FIG. 6 has the advantage of being replaceable during operation or at least without full disassembly of the turbine. The construction of FIG. 7 would require the disassembly or at least partial disassembly of the turbine in order to replace a sensor 602.

Figure 8:
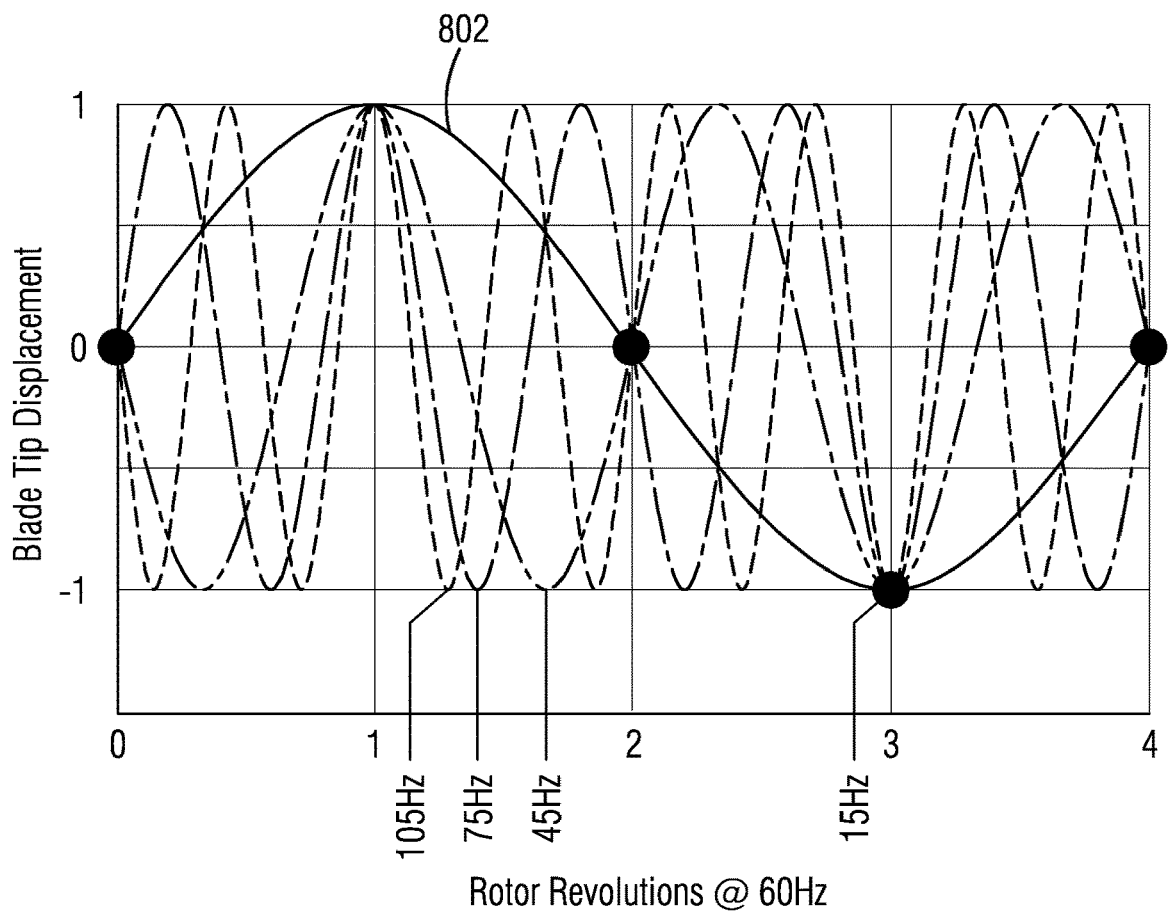
FIG. 8 illustrates a displacement measurement for a single sensor blade health monitoring system illustrating aliasing.

FIG. 8 illustrates why more than one sensor 602 may be desirable. As illustrated, a single sensor curve 802 is generated by measuring the tip displacement once per revolution, and more specifically to measure the arrival time of the blade tip 216 to determine the tip displacement. The measurements indicate that the blade 200 appears to be vibrating at 15 Hz. However, vibrations at 45 Hz, 75 Hz, 105 Hz, or various other higher frequencies would produce the same displacements such that these frequencies are also possible based on the measurements of the single sensor 602. However, the addition of additional sensors 602 can solve this aliasing problem by measuring the displacements at multiple points per revolution.

While FIG. 8 illustrates a situation where more than one sensor 602 may be employed, for situations where likely frequencies are known, a single sensor 602 can be used and can still provide accurate results. Many of the aliasing frequencies are known to be not possible and can be ignored such that only the frequencies of interest (those that are near the likely frequencies) are considered.

Each row of blades 200 can include a large number of free-standing blades (e.g., sixty or more). While the blades 200 are intended to be identical, subtle differences result in variations in the natural frequencies of the blades 200. The blade health monitoring system 600 uses mistuning analysis techniques to analyze complete rows of blades 200 as coupled systems. Because the blades 200 are dynamically coupled through the shaft 102, each of the blades 200 can respond at multiple first-bending-mode frequencies that are associated with various nodal diameters. This can make it very difficult to precisely and accurately assess the natural frequencies for each of the blades 200 using analysis techniques that only consider each of the blades 200 individually.

Mistuning identification techniques are uniquely well-suited for health monitoring of bladed turbine rotors 100. A key advantage of this approach is that it returns the frequencies of the substructures (i.e., the individual frequencies for each of the blades 200). Tracking the identified natural frequencies of the substructure can allow detection of a crack, identification of which blades 200 are damaged, and an assessment of the severity of the damage in each of the blades 200. Moreover, this method has been demonstrated to detect cracks that are much smaller than the critical size for mechanical separation of one of the blades 200 from the shaft 102.

Figure 9:
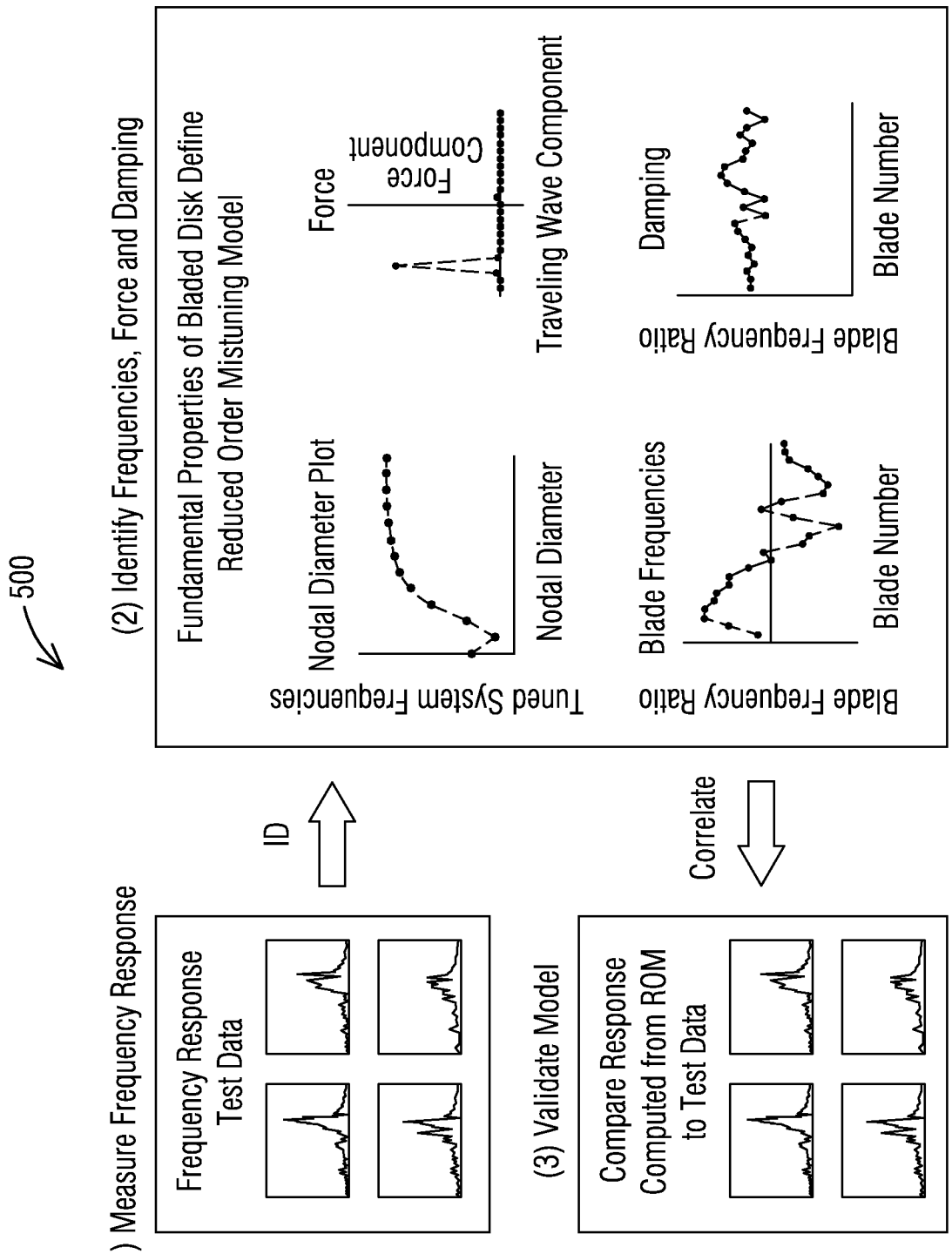
FIG. 9 schematically illustrates one possible arrangement for configuring the blade health monitoring system.

FIG. 9 illustrates an arrangement for developing a Reduced Order Model (ROM) using the fundamental model of mistuning. The illustration is well-suited to bladed disk type rotors. As illustrated in FIG. 9, frequency data is first gathered. The fundamental properties of the turbine rotor 100 being analyzed are next determined and used to develop the ROM. The ROM is then validated comparing response data calculated by the ROM to actual test data. 3

The blade health monitoring system 600 is intended to identify cracks that can lead to separation of all or most of the vane portion 202. The blade health monitoring system 600 does not rely on the actual vibration frequencies or mistuning ratios for each of the blades 200, but rather looks at changes in the measured frequencies or mistuning ratios for each of the blades 200 over a period of time. A mistuning ratio is a ratio or comparison of a blade's frequency to the average of that frequency for all the blades in the blade row. Thus, a first mistuning ratio would be the ratio of a blades first mode frequency to the average first mode frequency for that blade row, with a second mistuning ratio being a similar comparison of the second mode frequencies. The deviations from the reference frequencies or mistuning ratios provide far more consistent values for the analysis. As used herein, the term "vibration condition" will be used to include both vibration frequencies and/or mistuning ratios. Wherever the term "vibration condition" is employed, one should understand that the terms "frequency", "mistuning ratio", or both could be substituted for "vibration condition". In addition, a first vibration condition would include the first vibration mode and/or a first mistuning ratio, with a second vibration condition being the second vibration mode and/or a second mistuning ratio.

As discussed with regard to FIG. 4, each of the blades 200 is susceptible to life-limiting cracks in the three locations noted as well as other potential locations. The actual location of life-limiting cracks is a function of the particular blade design, the operations of the turbine, and other characteristics of the system.

With reference to the potential crack locations illustrated in FIG. 4, cracks at any of these locations can typically be expected to change the first mode 302 frequency and first mistuning ratio of the affected blade. Sensitivity to cracks at certain of these locations can be enhanced by monitoring for changes in second mode 304 frequency and/or the second mistuning ratio (i.e., the vibration condition) in addition to the first mode 302.

The blade health monitoring system 600 relies on detecting changes in frequency or mistuning ratio (i.e., the frequency condition) of blades 200 in operation and relating those changes in frequency or mistuning ratio or the frequency condition to crack sizes. If the permissible crack size is relatively large, the corresponding change in frequency condition is easier to detect. But if only small cracks can be tolerated, the blade health monitoring system 600 must be sensitive enough to detect the corresponding smaller changes in frequency condition. The use of blade materials with high toughness therefore provides a significant benefit.

Figure 10:
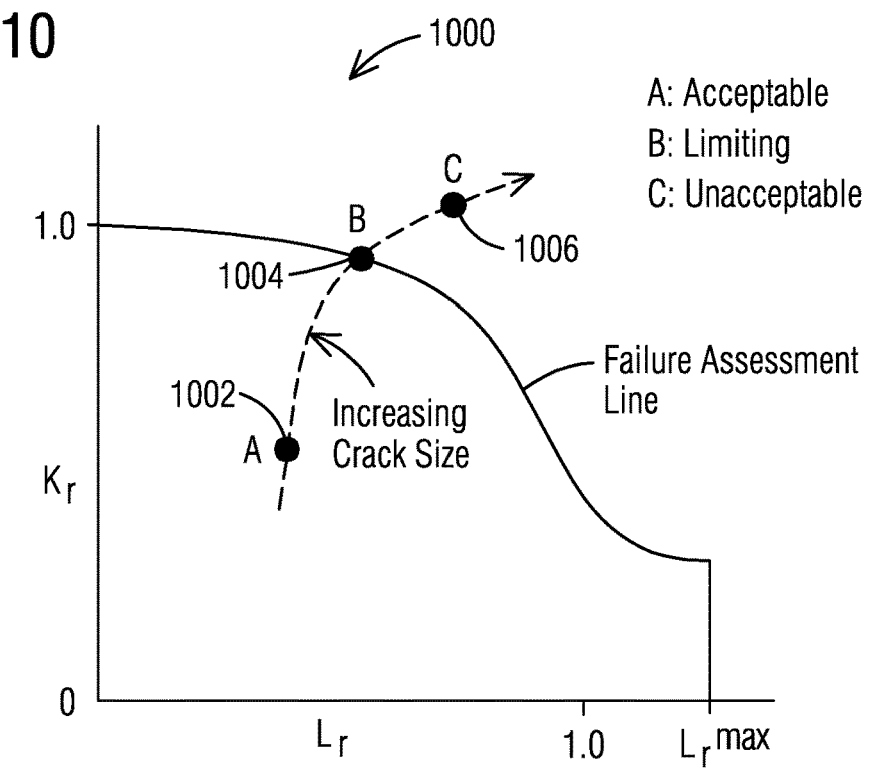
FIG. 10 illustrates a failure assessment diagram.

There are a variety of methods available to assess the acceptability or critical condition of components that contain defects. A common method is based on a failure assessment diagram 1000 as illustrated in FIG. 10. Assessment point A 1002 represents an acceptably small crack. Point B 1004 represents the calculated critical crack size. Point C 1006 predicts failure, i.e., a crack that is larger than the calculated critical crack size and not necessarily a failure of the component.

During commissioning of the blade health monitoring system 600, at least one sample data set is chosen to establish a baseline for subsequent assessment of potential changes in frequency conditions. The operating conditions for the baseline are chosen in an area where random broadband excitation is expected, and where the unit is expected to operate repeatedly and at least for an hour continuously. Turbine operating conditions can vary significantly with time, and variations in the excitation patterns at substantially different operating conditions can be large enough to produce measurable changes in the assessed mistuning. To improve the sensitivity of the blade health monitoring system 600 process, it can therefore be desirable in some cases to establish more than one baseline. Subsequent assessments can then be compared to the most appropriate baseline to assess potential changes in frequency or mistuning ratios. The similarity of the excitation at the assessment condition to the excitation for each of the baseline conditions can be quantified, for example, by calculating the correlation coefficient between the nodal diameter force distributions in the reduced-order mistuning model. In general, the baseline includes pairs of frequency and/or mistuning ratios with each pair including a baseline first mode frequency and/or mistuning ratio and a baseline second mode frequency and/or mistuning ratio collected at different operating conditions.

Figure 11:
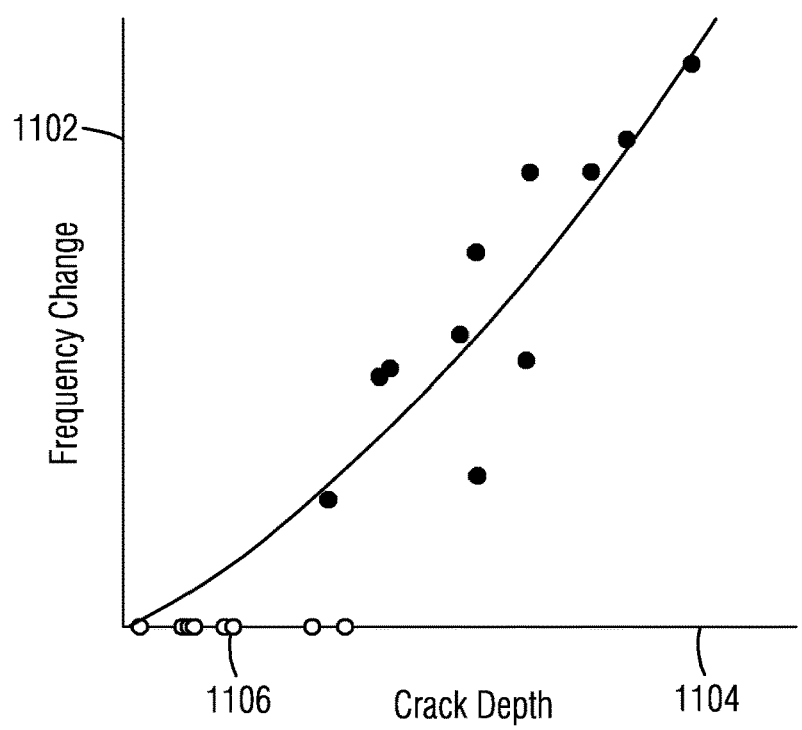
FIG. 11 is a chart of crack depth versus frequency change.

FIG. 11 shows the assessed frequency changes 1102 and the associated crack depths 1104 that were measured for several blades 200 of a single design. The open points 1106 represent blade root cracks for which the frequency changes 1102 were smaller than the blade health monitoring system 600 detection threshold. Variability in the data can be seen to decrease as crack sizes become larger. This is because the smaller cracks vary in shape (i.e., the ratio of depth to length). As the cracks become larger, their shapes become more consistent.

Figure 12:
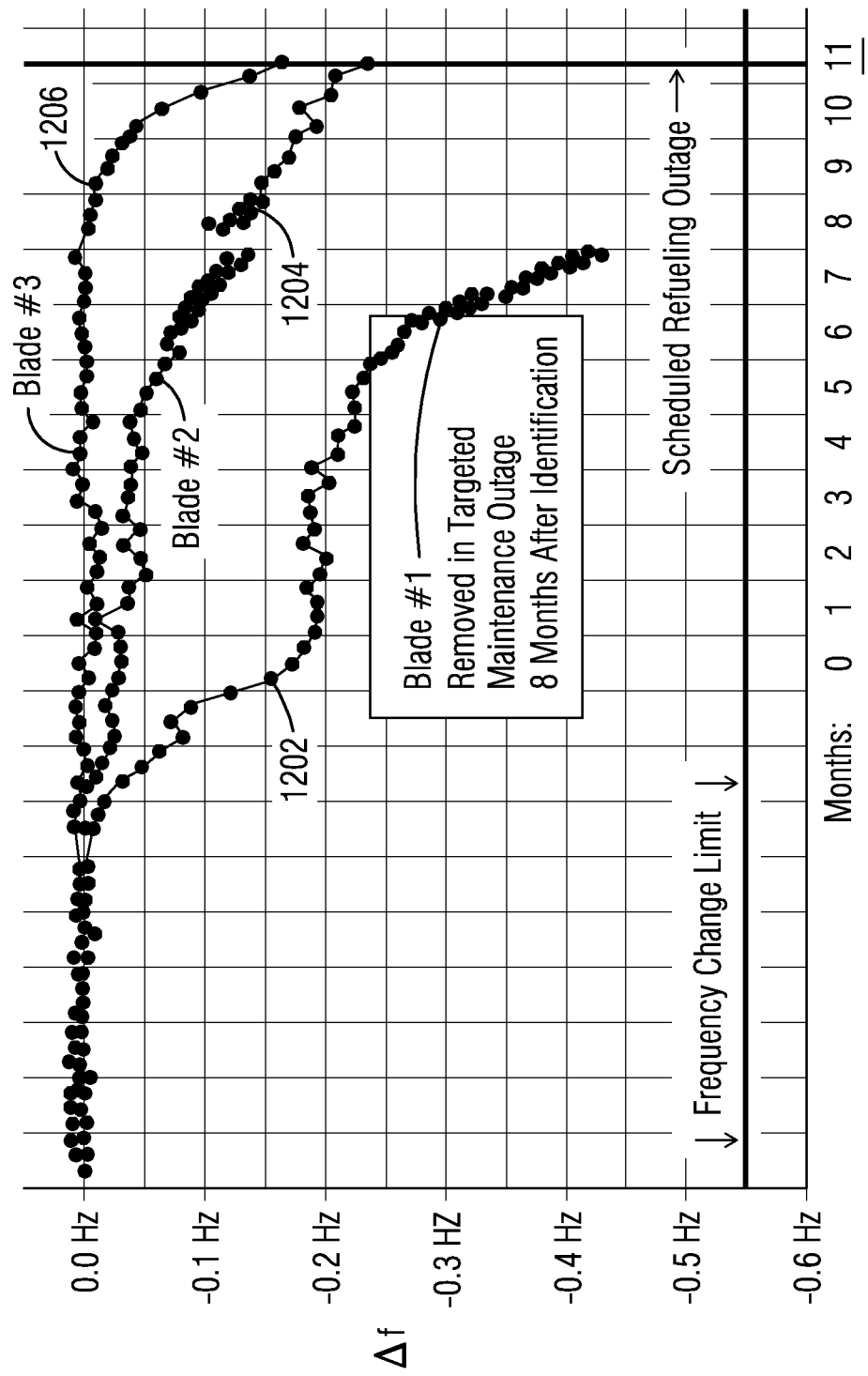
FIG. 12 is an example chart illustrating operation of the blade health monitoring system with three blades indicating cracks.

FIG. 12 shows an example in which the blade health monitoring system 600 is used to manage outage planning. In this example, the blade health monitoring system 600 detected a crack in a first blade 1202 in the last row of a low-pressure steam turbine. The unit continued to operate while monitoring the crack growth. The blade health monitoring system 600 indicated that the crack grew steadily for about three months, then paused for about three months before resuming its growth.

After eight months in this example, the first blade 1202 is removed and replaced. Based on the assessed crack growth rates and the planned outage schedule, the blade health monitoring system 600 predicted that the first blade 1202 would reach its maximum permitted size prior to the outage, thereby forcing an expedited outage. The blade health monitoring system 600 indicated that a second blade 1204 may include a crack but that it need not be replaced before the scheduled outage. In this example, the blade health monitoring system 600 provides ample notice for advance planning.

After returning to service, the blade health monitoring system 600 indicates that the crack in the second blade 1204 continues to grow at its previously observed rate. The example also illustrates a crack forming and rapidly growing in a third blade 1206. However, the blade health monitoring system 600 predicts that the unit will be able to successfully reach its scheduled refueling outage without requiring another maintenance outage.

The blade health monitoring system 600 can also be used for diagnostic purposes to identify operating conditions that can grow cracks. In the case shown in FIG. 12, the operating conditions in months 3 and 4 were clearly more favorable. As an interim measure, the turbine owner could use this information to adjust the operating parameters with the intent of minimizing potential crack growth.

Figure 13:
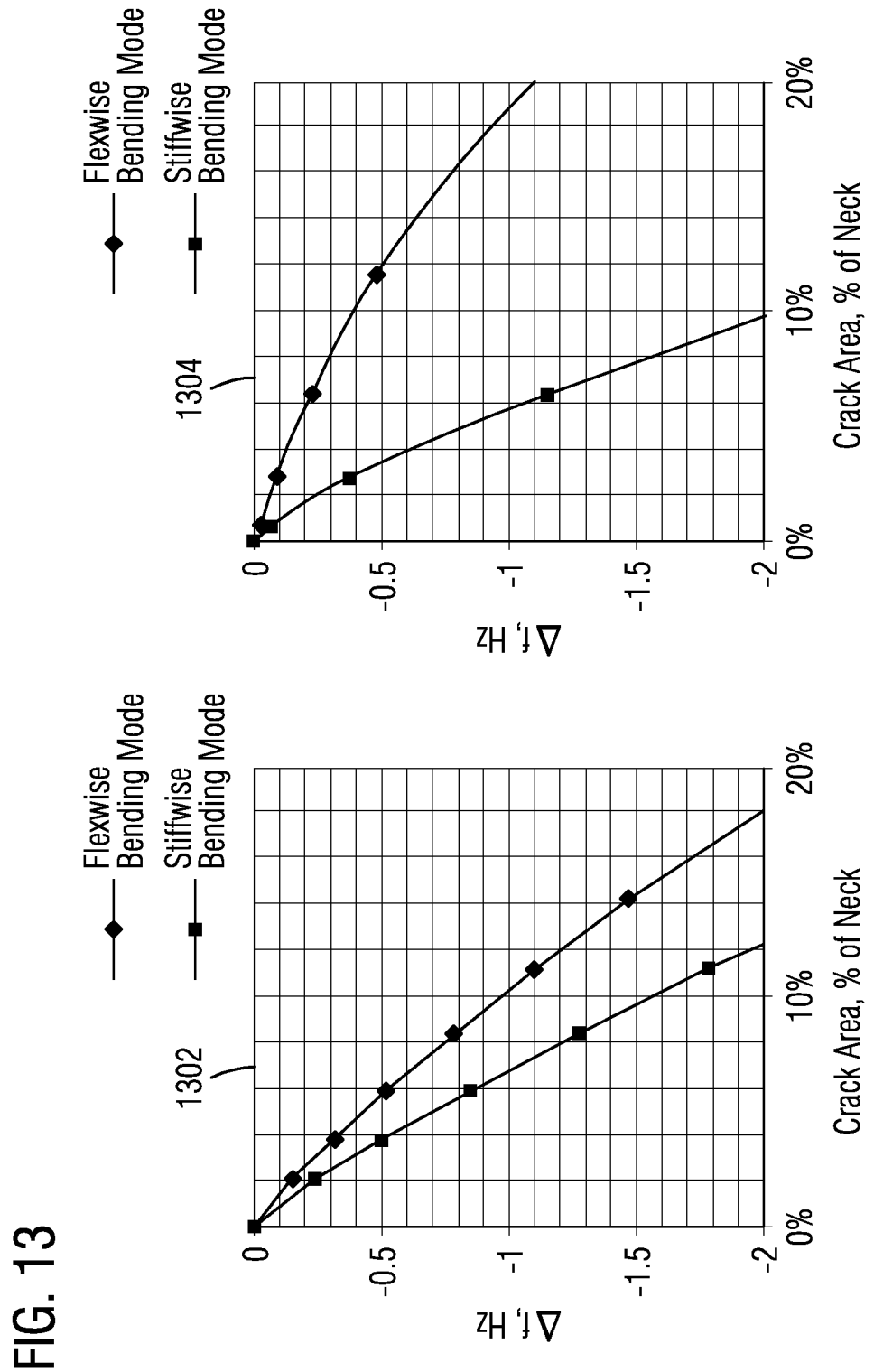
FIG. 13 includes two charts illustrating the frequency changes of the first mode and second mode for two crack locations.

As discussed, the blade health monitoring system 600 calculates changes in frequency for the blades 200 to determine if, and where a crack may be forming. FIG. 13 includes a first curve 1302 indicative of a crack forming at the third crack location 406 of FIG. 4, and a second curve 1304 indicative of a crack forming at the second crack location 404 of FIG. 4. The location of the crack that is causing the frequency changes can be inferred from the relative magnitudes of observed frequency changes for the two modes in a given blade. In addition, the magnitude of the changes of the two frequencies can indicate the size of the crack, which can be compared to the permissible crack size for that particular location.

FIG. 14 illustrates a routine 1400 operable by the blade health monitoring system 600. In block 1402, routine 1400 operates a turbomachine including a row of blades that includes a plurality of blades that contains a blade. In block 1404, routine 1400 determines a first vibration mode frequency for each blade of the row of blades. In block 1406, routine 1400 determines a second vibration mode frequency for each blade of the row of blades. In block 1408, routine 1400 compares the first vibration mode frequency for each blade to a predetermined baseline first vibration mode frequency to determine a first frequency change. In block 1410, routine 1400 compares the second vibration mode frequency for each blade to a predetermined baseline second vibration mode frequency to determine a second frequency change. In block 1412, routine 1400 analyzes the first frequency change and the second frequency change for each blade to determine which of the blades includes a crack and the likely location of the crack within that blade. In block 1414, routine 1400 uses the magnitudes of the first frequency change and the second frequency change to estimate a size of the crack.

The blade health monitoring system 600 can in principle be accomplished using manually initiated computer calculations that are performed periodically. Manual processing, however, becomes impractical when more than a very small number of blade rows are being monitored. Moreover, it is desirable to perform the blade health monitoring system 600 process frequently, e.g., at least once per day, to add sensitivity to trend analyses and to provide earlier identification of any significant frequency deviations.

To perform frequent blade health monitoring system 600 assessments efficiently and effectively, it can be desirable to automatically transmit packets of time-of-arrival data from the power plant to a central office for data analysis. Such transmittals have been successfully accomplished in compliance with the cybersecurity requirements that apply to nuclear power stations. After the data has been received, it can be automatically processed. If a potentially significant frequency deviation is identified, a notification can be automatically issued to a qualified specialist engineer for further detailed review of the data.

Synopses of the blade health monitoring system 600 results can be reported to the turbine operator periodically. If a frequency change is assessed to be likely the result of a blade crack, a report should be issued immediately. That report should also contain recommended actions that are based on the known characteristics of the specific blade design and of the specific power plant. The recommendations might include, for example, operational changes such as limiting speed-cycling, or avoiding operation within a specific region of load and condenser pressure that is known to potentially produce larger blade vibrations. The recommendations could also include suggested blade replacement timing such as during an upcoming outage or maintenance cycle.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of determining the location and size of a crack in a blade in a turbomachine, the method comprising:
   operating the turbomachine including a row of blades that includes a plurality of blades that contains the blade;
   determining a first vibration condition for each blade of the row of blades;
   determining a second vibration condition for each blade of the row of blades;
   comparing the first vibration condition for each blade to a predetermined baseline first vibration condition to determine a change in the first vibration condition;
   comparing the second vibration condition for each blade to a predetermined baseline second vibration condition to determine a change in the second vibration condition;
   analyzing the change in the first vibration condition and the change in the second vibration condition for each blade to determine which of the blades includes a crack and the likely location of the crack within that blade; and
   using the magnitudes of the change in the first vibration condition and the change in the second vibration condition to estimate a size of the crack.

2. The method of claim 1, further comprising determining a plurality of pairs of vibration conditions, each pair including a baseline first vibration condition and a baseline second vibration condition, each pair determined at a different operating condition of the turbine.

3. The method of claim 2, further comprising selecting one of the pairs of vibration conditions as the baseline first vibration condition and the baseline second vibration condition.

4. The method of claim 1, further comprising measuring a time of arrival of each blade of the plurality of blades with a single sensor.

5. The method of claim 1, further comprising predefining a permissible crack depth and estimating a time for the crack to reach the permissible crack depth.

6. The method of claim 1, further comprising positioning more than one sensor around the row of turbine blades, each sensor positioned apart from the other sensors and operable to measure a time of arrival of a tip of each blade, the time of arrival being indicative of a blade tip displacement.

7. The method of claim 6, wherein the steps of determining a first vibration condition and determining a second vibration condition includes analyzing the time of arrival measurements from each of the more than one sensors to calculate the first vibration condition and the second vibration condition.

8. The method of claim 1, wherein the first vibration condition includes one of a first mode vibration frequency and a first mode mistuning ratio and the second vibration condition includes one of a second mode vibration frequency and a second mode mistuning ratio.

9. A blade health monitoring system for measuring the health of a row of rotating blades, the system comprising:
   a sensor fixedly positioned adjacent the row of rotating blades and operable to measure a parameter; and
   a computer including a processor, the processor operable to determine a first mode vibration condition and a second mode vibration condition for each of the blades in the row of rotating blades based on the measured parameter, the processor further operable to compare each first mode vibration condition and second mode vibration condition to a baseline first vibration condition and a baseline second vibration condition to determine a change in the first vibration condition and a change in the second vibration condition, the processor determining the position and size of a crack in any one of the blades using the change in the first vibration condition and the change in the second vibration condition.

10. The blade health monitoring system of claim 9, wherein the computer includes a memory storage device operable to store a plurality of baseline first vibration conditions and a plurality of baseline second vibration conditions, and wherein the processor selects the baseline first vibration condition and the baseline second vibration condition from the plurality of baseline first vibration conditions and the baseline second vibration conditions.

11. The blade health monitoring system of claim 9, wherein the first vibration condition includes one of a first mode vibration frequency and a first mode mistuning ratio and the second vibration condition includes one of a second mode vibration frequency and a second mode mistuning ratio.

12. The blade health monitoring system of claim 9, wherein the computer is operable to determine the change in the first vibration condition and the change in the second vibration condition, and wherein the magnitude of the change in the second vibration condition relative to the change in the first vibration condition is indicative of the location of the crack within a particular blade.

13. The blade health monitoring system of claim 9, wherein the sensor is positioned outside of the row of rotating blades.

14. The blade health monitoring system of claim 13, wherein the sensor is a first of a plurality of sensors and wherein each sensor of the plurality of sensors is positioned circumferentially outside of the row of rotating blades in one and only one of the upper half of a casing and a lower half of the casing.

15. The blade health monitoring system of claim 9, wherein the parameter is a time of arrival and wherein the sensor measures the time of arrival for each blade of the plurality of blades, and wherein the computer uses the measured time of arrival for each blade to determine a tip displacement for each blade and to determine a first vibration condition and a second vibration condition of each blade.

16. A method of determining the location and size of a crack in a blade, the method comprising:
    measuring a time of arrival of a tip of the blade at an angular position in a rotation;
    using the time of arrival to calculate a displacement of the tip of the blade;
    using the displacements to calculate a first vibration condition and a second vibration condition for the blade;
    comparing the first vibration condition and the second vibration condition for the blade to a predetermined baseline first vibration condition and a predetermined baseline second vibration condition for the blade to determine a change in the first vibration condition and a change in the second vibration condition; and
    using the magnitude of the change in the second vibration condition relative to the change in the first vibration condition to determine the likely location of the crack and using the magnitude of the change in the first vibration condition and the change in the second vibration condition to determine the size of the crack.

17. The method of claim 16, further comprising determining a plurality of frequency pairs each at a different operating condition of the turbine, each frequency pair including a baseline first vibration condition and a baseline second vibration condition.

18. The method of claim 16, further comprising measuring the time of arrival of the blade with a single sensor.

19. The method of claim 16, wherein the sensor is a first of a plurality of sensors and wherein each sensor of the plurality of sensors is positioned circumferentially outside of the blade, each of the sensors measuring the time of arrival at different circumferential positions.

20. The method of claim 16, further comprising predefining a permissible crack depth and estimating a time for the crack to reach the permissible crack depth.

21. The method of claim 16, further comprising positioning three sensors to measure the first displacement, the second displacement, and the third displacement, each sensor positioned apart from the other sensors.

22. The method of claim 16, wherein the first vibration condition includes one of a first mode vibration frequency and a first mode mistuning ratio and the second vibration condition includes one of a second mode vibration frequency and a second mode mistuning ratio.

* * * * *